Patented Aug. 24, 1954

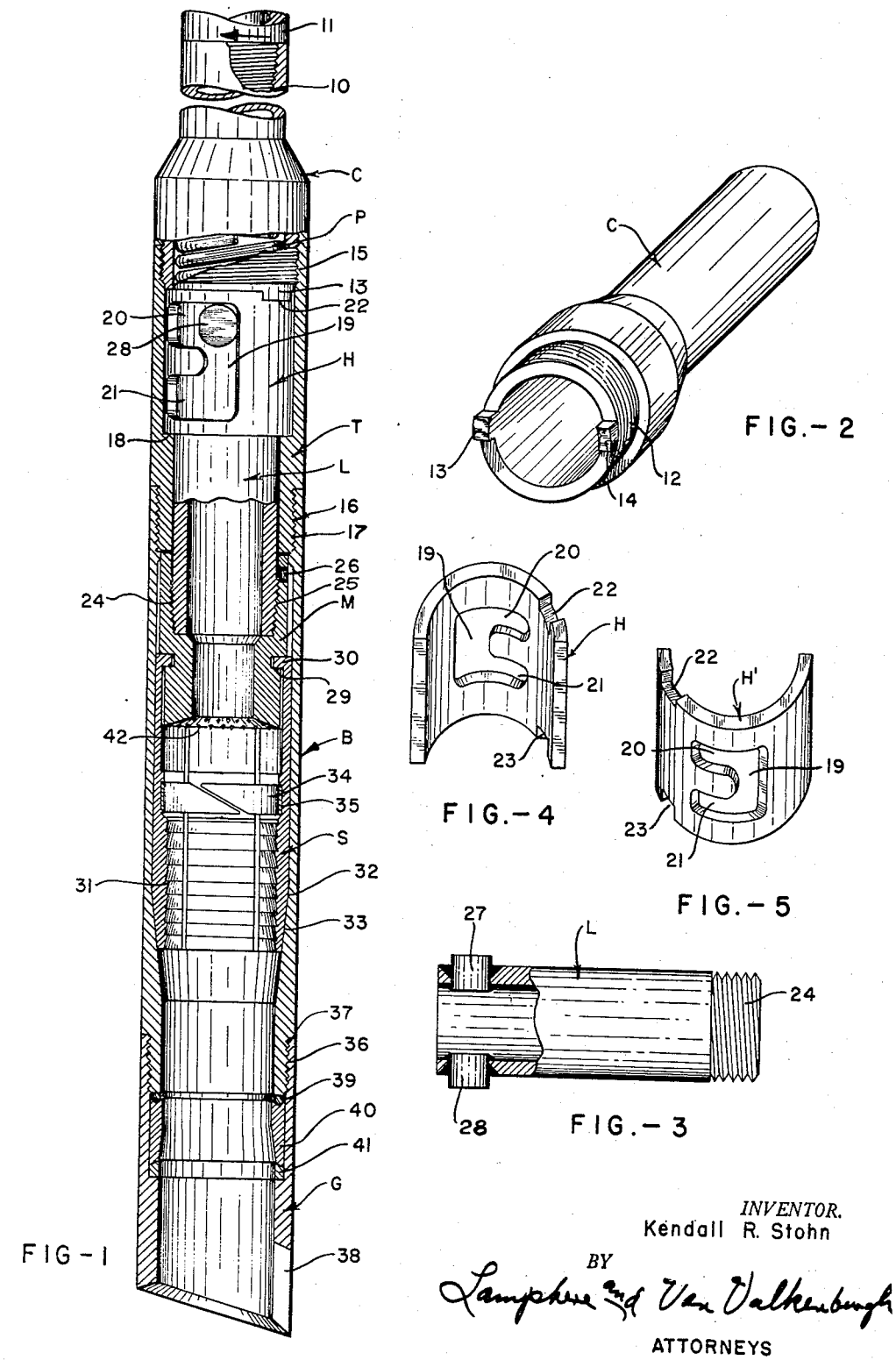

2,687,323

UNITED STATES PATENT OFFICE 2,687,323

FISHING TOOL FOR WELL DRILLING

Kendall R. Stohn, Lubbock, Tex.

Application May 28, 1951, Serial No. 228,620

10 Claims. (Cl. 294—96)

1

This invention relates to a tool for use in drilling wells or like bores, and more particularly to an improved fishing tool employable to make attachment to stuck drill pipe, tubing casing or other members in a well where it is possible to obtain a hold thereon.

One of the objects of my invention is to produce an improved fishing tool for well drilling operations which is simple and rugged in construction, easy to operate and efficient in its gripping action.

A further object is to produce a fishing tool that is so designed that it can be easily and quickly conditioned in order to accomplish gripping by either a left or right hand rotation of the string on which it is carried.

A further object is to so design a fishing tool of the overshot type that it can be conditioned for either left or right hand operation by merely reversing certain parts thereof, which parts cooperate with other parts in permitting the tool slips to be locked in either an inoperative condition or a gripping condition.

Yet a further object is to produce an overshot fishing tool in which is embodied a new mounting arrangement of the slips, permitting easy and efficient operation thereof by the well string.

Still another object is to provide improved means in an overshot fishing tool for maintaining the slips thereof in inoperative condition.

Other objects of my invention will become apparent from the following description taken in connection with the accompanying drawing in which:

Figure 1 is a longitudinal sectional view, with some parts shown in full, of an overshot fishing tool embodying my invention, said tool being in inoperative condition and arranged for left hand rotation of the string to lock the slips in either gripping position or released position, and right hand rotation to unlock;

Figure 2 is a perspective view of the top member whereby the tool is connected to the string and through which the half shells are controlled, said shells permitting the changing between left and right hand control;

Figure 3 is a side view of the sleeve having lugs for cooperating with the slots of the half shells and thereby controlling the slips; and Figures 4 and 5 are perspective views of the two half shells whereby left and right hand control can be made at will by a reversal of the shells.

Referring to the drawings in detail, which disclose a preferred embodiment of a fishing tool of the overshot type, it will be seen that it is composed of the following members: a top connecting sub C, a tubular sub T within which are two control half shells H and H', and a tubular body B at the lower end of which is a guide member G. In addition there is a locking member L cooperating with the half shells which carries at its lower end a connecting member M whereby said locking member is rotatably connected to the slips S. The upper end of the locking member has a pressure spring P acting thereon. All of these parts are associated together in a manner best shown in Figure 1, the longitudinal sectional view.

It will be noted that the top connecting sub C has an internal threaded socket 10 at its upper end whereby the overshot can be threaded to the lower end section 11 of the drill stem and thus lowered into the well by the drill stem to be controlled thereby from the top of the well during fishing operations. The lower end of the connecting sub C is enlarged and provided with external threads 12 and diametrically opposed lugs 13 and 14 on its end edge. The sub T has its upper end provided with internal threads 15 whereby it can be connected to the top connector sub C. The lower end of this sub T is provided with external threads 16 whereby it can be connected to the upper end of the body B by its internal threads 17. The tubular sub T has an internal shoulder 18 properly positioned so that the two half shells H and H' can be received in the tubular sub and held between the shoulder and the end of the top connecting sub C.

The two half shells which are shown in Figures 4 and 5 are of identical construction, each being a substantial semicylinder. In the wall of each half shell is a double J slot having a main longitudinal leg 19 and two laterally extending legs 20 and 21 at the ends thereof, these lateral legs extending from the longitudinal leg in the same direction. The end edges of the half shell have clutch slots 22 and 23 which are capable of receiving the lugs 13 and 14 on the lower end of the top connector member. When the half shells have one position in the tubular sub T (shown in Figure 1) the clutch slots 22 will be at the top and these slots will then receive the lugs 13 and 14. When the half shells are reversed end for end and placed in the tubular sub T, the clutch slots 23 will be at the top for receiving the lugs 13 and 14. Thus it will be seen that regardless of how the half shells are placed in the tubular sub they will be clutched to the connecting sub C when it is screwed into the top of the sub T.

There can then be no relative movement between any of these parts.

Positioned within the tubular sub T, with its upper end positioned in the two half shells, is the locking member L. The lower end of this locking member has external threads 24 whereby it can be connected to the member M by the internal threads 25 on the upper end thereof. In order that the locking member L and the connecting member M may be prevented from being unscrewed, a locking set screw 26 is provided, as shown. The upper end of the locking member L has welded therein diametrically positioned pins 27 and 28, which pins will extend into the double J slots in the two half shells and thus control the operation of the slips S. The pins 27 and 28 are of a size to move in the longitudinal legs of the double J slots and also into the lateral legs at the ends of said longitudinal slots. When the pins are free to move in the longitudinal legs, then the locking member will be free to move longitudinally and thus the slips operated as will become apparent.

The spring P is positioned in the lower enlarged end of the connecting sub C and acts to apply longitudinal pressure to the locking member L and the connecting sub and the parts connected thereto. The spring is normally under compression and whenever the locking member is free to move longitudinally by the positioning of the pins in the longitudinal legs of the H slots, the spring can expand to push the locking member relatively downwardly.

The connecting member M carried at the lower end of the locking member L has an annular groove 29 which receives inwardly extending flanges 30 on the upper ends of the slips S. On the particular overshot shown there are only three slips S, but this number may be increased if desired. These slips extend downwardly below the lower end of the connecting member M and are provided on their inner surface with gripping teeth 31. The lower outer surface of each slip is provided with a partial conical surface 32 for cooperation with a section of the full conical surface 33 on the inner wall of the body B. In the position shown in Figure 1 the slips are in their retracted or inoperative positions since they are at the upper part of the conical surface 33. However, if the slips are moved downwardly, the conical surface on the body member will so co-act with the partial conical surfaces on the several slips as to cause these slips to be wedged inwardly so that the teeth of the slips have a gripping action upon any member desired to be gripped, such as a part of a drill pipe, a casing, etc., commonly called a fish. The slips S will be normally held outwardly against the inner surface of the body member by a split ring spring 34. It will be noted that this spring is received in grooves 35 on the inner surface of the slips so that the split ring will not be caught by the fish moving in the slips.

The guide member G has its end provided with internal threads 36 whereby it can be connected to the lower end of the body B by its external threads 37 thereon. The guide G has a cut out 38 in its wall so as to facilitate the entry of the fish into the overshot tool whereby it can be properly engaged by the slips. There is also provided in the guide a plurality of packing elements 39, 40 and 41 of suitable construction.

It will be noted that the overshot has a passage completely through it so that fluid can be circulated down the drill stem and through the overshot and thus accomplish washing of the fish.

In operating the overshot it will be necessary to have relative rotation between the connecting sub C, the half shells, the sub T and the body all connected together as a unit and the locking member L and the connecting member M for the slips all connected together as a unit. To aid in insuring this relative movement, the lower end of the member M will be provided with a plurality of prongs 42, as shown in Figure 1. These prongs thus can engage the top of any fish, such as a pipe or tube which is caused to be projected into the slips of the overshot. Thus the prongs, when engaging the fish, tend to prevent any rotation of the member M and the locking member L and the other connected together parts, including the two half shells H, the body, etc., can be rotated by the drill stem relative to the locking member.

In connection with the operation of the overshot as described, let it be assumed that the two half shells H and H' are placed in the tubular sub T in the manner disclosed. This will be called a left hand conditioning of the tool. Under such conditions the slips S can be locked in their inoperative position shown by giving such relative rotation between the locking member L and the two half shells that the pins 27 and 28 will be in the upper lateral legs 20 of the double J slots. The spring P will then be compressed as much as possible. The tool can then be lowered into the well in this inoperative condition. When it reaches the fish, which may be a drill pipe, tubing or casing which has become stuck in the well during drilling operations, the upper end of this fish will move in through the guide and into the slips which are held against the wall of the body member by the split ring spring 34. The upper end of the fish will be engaged by the prongs 42 on the lower end of the connecting member M. The slips S can then be released from their inoperative position by turning the drill stem in the direction of the arrow, that is, to the right. This will then result in the pins 27 and 28 on the locking member moving into the longitudinal leg 19 of the double J slots in the half shells. If the drill stem is now pulled upwardly, the spring P will maintain the locking member L from upward movement with the stem. Consequently there will be upward movement of the body relative to the slips. This will result in the conical surface 33 on the body forcing the slips inwardly and causing the teeth thereon to have gripping engagement with the upper end of the fish. The greater the pull upwardly, the greater the wedging action on the slips. When the locking member assumes a position where the pins 27 and 28 are opposite the lower legs 21 of the double J slots, the slips can be locked in position and this is accomplished by rotating the drill stem in the direction opposite that indicated by the arrow, that is, to the left. Consequently the pins 27 and 28 will be received in the legs 21. If the pins are not fully opposite the legs 21, they nevertheless can be forced therein by the curved surface at the entrance. This will aid in the gripping action. At any time it is desired to unlock the slips, the drill stem can be again rotated in the direction of the arrow and this will then place the pins 27 and 28 in the longitudinal legs 19 of the half shells. Then, by allowing downward movement of the drill stem, the longitudinal legs of the half shells can be moved so the pins will be opposite the upper lateral legs 20 of the double J slots and can be placed in these legs when the drill stem is turned in the direction opposite the arrow.

If it should be desired to operate the overshot tool so the slips will be locked in either inoperative or operative position by a rotation of the drill stem in a direction the same as the arrow, that is, a right hand operation, this can be done by reversing the two half shells H and H' when the tool is at the top of the well. When this is accomplished it will be noted that the legs 20 and 21 are reversed not only from top to bottom and vice versa, but such legs will be on the opposite side of the longitudinal leg 19. Because of the clutch slots 23 on the lower ends of the two half shells, the half shells can be clutched to the connecting sub C by the lugs 13 and 14 when the reversal of the half shells is performed.

From the foregoing description it will be seen I have devised a very rugged fishing tool having a minimum number of parts. The tool is so designed that it is capable of either left or right hand operation and this operation can be set, as desired, at the top of the well before the tool is used, all in a very easy and quick manner. To make the reversal the top connecting sub C is unscrewed from the tubular sub T, the two half shells shifted and then the top connecting sub reattached.

I have disclosed my invention in an overshot type of fishing tool, but it is to be understood this is by way of example only. Other types of fishing tools can have the right and left hand control feature embodied therein in a manner that will readily suggest itself to those skilled in the art. Thus, being aware of the possibility of modifications in the particular structure shown without departing from the fundamental principles of my invention, I desire that it be understood that the scope of the invention is not to be limited in any manner except in accordance with the appended claims.

What is claimed is:

1. In a fishing tool of the class described, means for gripping a fish, two members mounted for limited relative longitudinal and rotative movement, means for operating said gripping means by relative longitudinal movement between said members of the tool, means for locking the gripping means in a predetermined position by rotation of one of said members relatively to the other in one direction, and means for permitting said members to be placed in a different relationship that locking can be accomplished by rotation of said one member relatively to the other in the opposite direction, said locking means comprising a double J slot in the one member and a lug carried by the other member and projecting into the slot, said one member with the double J slot being constructed and mounted so as to be removable and reversible end for end to thus change the lateral legs of the slot from one side to the other of the longitudinal connecting leg thereof so that the opposite direction of rotation for locking can be accomplished.

2. In a fishing tool of the class described, a body member, slip means carried thereby for gripping a fish, means for operating the slip means to gripping and released positions by relative longitudinal movement therebetween, and means for locking of the slip means in a predetermined position including a first member connected with the body member and a second member connected with the slip means with said first and second members having interengaging parts capable of being placed in locking position by rotation of one member of said first and second members in one direction relative to the other member, one of said first and second members being mounted for removal from the tool so that it can be reversed end for end to thereby so establish such relationship of interengaging parts of the first and second members that locking is accomplished by a relative rotation between the said first and second members in the opposite direction from the first mentioned direction.

3. In a fishing tool of the class described, a body member, slip means carried thereby for gripping a fish, means for operating the slip means to gripping and released positions by relative longitudinal movement therebetween, and means for locking of the slip means in an operative position including a first member connected with the body member and a second member connected with the slip means with said first and second members having interengaging parts including a slot and a receivable lug placeable in locking position by rotation of one member of the first and second members in one direction relative to the other member, said member having the slot being mounted for removal from the tool so that it can be reversed end for end to thereby so establish such relationship of the slot and lug that locking is accomplished by a relative rotation between the first and second members in the opposite direction from the first mentioned direction.

4. In an overshot fishing tool of the class described, a hollow body member, slips in said body members provided with internal grooves extending in a circumferential direction, cooperating means between the slips and body member for causing the slips to move inwardly to accomplish gripping of a fish upon relative longitudinal movement between the slips and body, a split annular spring positioned in the grooves of the slips and acting to bias the slips radially outwardly, and means for positively locking the slips from longitudinal movement relative to the body in either an operative or inoperative position.

5. In an overshot fishing tool of the class described, a hollow body member, slips in said body members, cooperating wedging means between the slips and body member for causing the slips to move inwardly to accomplish gripping of a fish upon relative longitudinal movement between the slips and body, a split annular spring positioned inside the slips and acting to bias the slips radially outwardly, spring means normally acting in a longitudinal direction to press the slips and cause them to move relatively to the body to an operative position by functioning of the wedging means, and means for locking the slips against longitudinal movement relative to the body in either an operative or inoperative position.

6. In an overshot fishing tool of the class described, a hollow body member, slip means in said body member, cooperating means between the slip means and body member for causing the slip means to move radially inwardly to accomplish gripping of a fish upon relative longitudinal movement between the slip means and body, a locking member having a locking pin, means for connecting the locking member to the slip means whereby the slip means can be moved thereby yet the locking member can be rotated relatively to the slip means, and means including a removable member carried by the body member and provided with slot means receiving the locking pin for permitting the slip means to be locked in an operative condition by a relative rotation in one direction between the body member and the locking member, said removable member of the last named means being reversible end for end and the slot means therein having connected laterally extending legs so placed in the member that upon reversal of said member the locking can be accomplished by relative rotation of the locking member in the opposite direction.

7. A fishing tool of the class described, means for gripping a fish, means for operating said gripping means by relative longitudinal movement between members of the tool, and means for locking the gripping means in an operative position, said means comprising a locking member connected with the gripping means and a second removable member, said locking member and removable member having interengaging parts and the removable member having such an interengaging part that interengagement between the parts will take place to hold the gripping means operative when there is relative rotation in one direction between the locking member and the removable means, and said removable means having another part for interengagement with the interengaging part of the locking member for holding of the gripping means operative when there is relative rotation of the locking member in the opposite direction, said last named other part on the removable means being conditionable for interengagement with the interengaging part only upon reversal end for end of the removable member.

8. In an overshot tool of the class described, a tubular body, slips mounted in the body for relative longitudinal movement, cooperating means on the slips and body for moving the slips inwardly by relative longitudinal movement of the body and slips, and means for controlling the relative movement between the slips and body including a member carried by the body having a slot therein with a longitudinal leg and lateral legs extending therefrom in the same direction and a second member connected with the slips and having a part cooperating with the slot, said member having the slot being reversible with respect to the body so that in one position thereof one lateral leg of the slot therein will assume a position requiring rotation of the body in one direction to lock the second member against relative longitudinal movement with respect to the body and in the reverse position the other lateral leg of the slot will assume a position requiring rotation of the body in the opposite direction to lock the second member against relative longitudinal movement with respect to the body.

9. In a tool of the class described, a tubular body, slips mounted in the body for relative longitudinal movement, cooperating means on the slips and body for moving the slips inwardly by relative longitudinal movement of the body and slips, and means for controlling the relative movement between the slips and body including two half shell members carried by the body with each having a slot therein and a second member connected with the slips and having parts cooperating with the slots in the half shells, each said slot being so formed that the cooperating part will permit the second member to move longitudinally relative to the body or to be locked against relative longitudinal movement by a rotation of the body in one direction with respect to the second member, said half shell members having the slots being reversible with respect to the body so that each slot therein will assume a position requiring rotation of the body in the opposite direction to lock the second member against relative longitudinal movement with respect to the body.

10. In an overshot fishing tool of the class described, a tubular body, slips mounted in the body for relative longitudinal movement, cooperating means on the slips and body for moving the slips inwardly by relative longitudinal movement of the body and slips, means for controlling the relative movement between the slips and body including a member carried by the body having a slot therein and a second member connected with the slips and having a part cooperating with the slot, said slot being so formed that the second member can move longitudinally relative to the body or can be locked against relative longitudinal movement by a rotation of the body in one direction with respect to the second member, said member having the slot being reversible with respect to the body so that the slot therein will assume a position requiring rotation of the body in the opposite direction to lock the second member against relative longitudinal movement with respect to the body, and means including a member disconnectable with the body for holding the member with the slot from relative rotation with respect to the body, said disconnectable member also serving a connecting member between the fishing tool and a well drilling stem.

References Cited in the file of this patent

UNITED STATES PATENTS

| Number | Name | Date |
| --- | --- | --- |
| 1,528,561 | Nixon | Mar. 3, 1925 |
| 1,839,493 | Nutter | Jan. 5, 1932 |
| 2,026,778 | Dumble | Jan. 7, 1936 |
| 2,105,885 | Hinderliter | Jan. 18, 1938 |
| 2,242,602 | Watson | May 20, 1941 |